United States Patent
Kim et al.

(10) Patent No.: US 6,235,827 B1
(45) Date of Patent: May 22, 2001

(54) POLYMER COMPOSITION FOR COATINGS WITH HIGH REFRACTIVITY CONDUCTIVITY, AND TRANSPARANCY

(75) Inventors: Hyun Don Kim, Tajeon-shi; Hae Ryong Chung, Suwon-shi; Min Kyo Cheong, Seoul; Tu Won Chang, Tajeon-shi, all of (KR)

(73) Assignee: Cheil Industries, Inc. (KR)

( * ) Notice: Subject to any disclaimer, the term of this patent is extended or adjusted under 35 U.S.C. 154(b) by 0 days.

(21) Appl. No.: 09/455,698

(22) Filed: Dec. 7, 1999

(30) Foreign Application Priority Data

Dec. 17, 1998 (KR) .................................................. 98-55759

(51) Int. Cl.$^7$ .................................................. C08K 3/10
(52) U.S. Cl. .................................................. 524/403
(58) Field of Search .................................................. 524/403

(56) References Cited

U.S. PATENT DOCUMENTS

| | | | |
|---|---|---|---|
| 5,035,926 | 7/1991 | Jonas et al. | 526/527 |
| 5,391,472 | 2/1995 | Muys et al. | 430/527 |
| 5,523,469 | 6/1996 | Guyon | 562/41 |
| 5,572,086 | 11/1996 | Tong et al. | 313/478 |
| 5,652,477 | 7/1997 | Tong et al. | 313/479 |
| 5,681,885 | 10/1997 | Kinoshita et al. | 524/430 |
| 5,773,150 | * 6/1998 | Tong et al. | 428/429 |

FOREIGN PATENT DOCUMENTS

| | | | |
|---|---|---|---|
| 19650147 | * 6/1998 | (DE) . | |
| 999242 | * 5/2000 | (EP) . | |
| 2000017119 | * 3/2000 | (WO) . | |
| 2000027909 | * 5/2000 | (WO) . | |

OTHER PUBLICATIONS

Jonas et al, Macromol. Symp. (1995), pp 169–173, 1994.*
Ghosh et al, Synth. Met. (1999), vol. 101(1–3), pp 413–416.*
Lee et al, Mol. Cryst. Liq. Cryst. Sci. Technol., Sect. A (1999), vol. 337, pp 213–216.*
Lee et al, Mol. Cryst. Liq. Cryst. Sci. Technol., Sect. A (1999), vol. 327, pp 237–240.*

* cited by examiner

Primary Examiner—Erma Cameron
(74) Attorney, Agent, or Firm—Fish & Richardson P.C.

(57) ABSTRACT

Disclosed is a polymer composition for coatings with high refractivity, conductivity and transparency. The composition comprises 2–20 weight % of an aqueous polythiophene-based conductive polymer solution having a solid content of 1.2–1.5 weight %; 0.5–20 weight % of a highly refractive, inorganic sol solution having a solid content of 14–16 weight %; 50–97.4 weight % of an alcohol containing 1–3 carbon atoms; 0.1–10 weight % of an amide solvent; 0.005–0.1 weight % of a water- or an alcohol-soluble resin binder; and 0.005–0.05 weight % of a sulfonic acid group-containing monomer dopant. The composition can be applied to CRT external glass and other transparent substrates to allow thin films which have a refractive index of 1.6–2.0, a transmittance of 90–98% and a surface resistance of $1 \times 10^3 - 1 \times 10^8$ Ω/□.

7 Claims, 1 Drawing Sheet

[Fig 1]
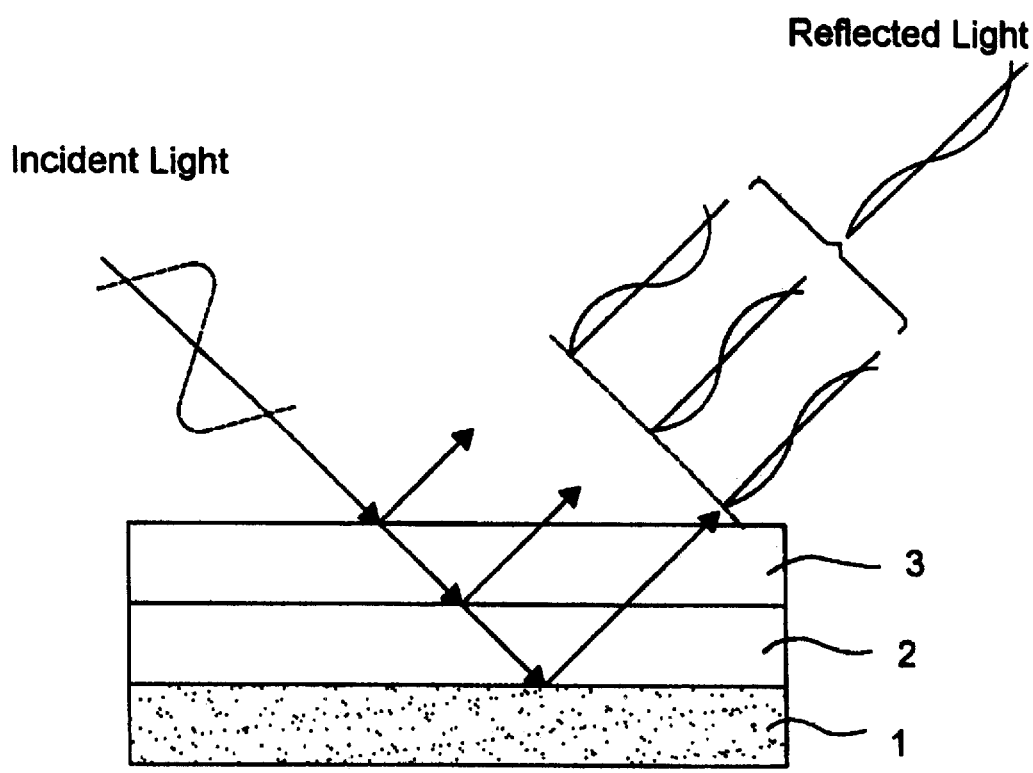
[Fig 2]
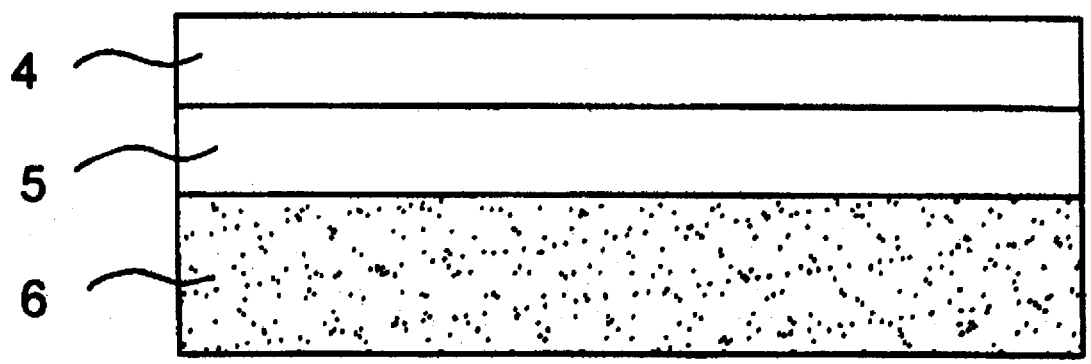

POLYMER COMPOSITION FOR COATINGS WITH HIGH REFRACTIVITY CONDUCTIVITY, AND TRANSPARANCY

BACKGROUND OF THE INVENTION

1. Description of the invention

The present invention relates to a polymer composition for coatings with high refractivity, conductivity and transparency. More particularly, the present invention relates to the use of an inorganic sol, an amide solvent and a sulfonic acid group ($SO_3H$)-containing monomer dopant, in combination, in improving the refractivity, conductivity and transparency of a polythiophene-based polymer composition.

2. Description of the Prior Art

Representative of conductive polymers, polyanilines, polypyrroles, and polythiophenes, collectively called synthetic metal, have been suggested to be applicable for where conductivity and plastic properties are needed, such as electromagnetic wave-shielding materials, electrodes for secondary cells, transparent electrodes, etc, by virtue of their good conductivity and being easily polymerized. However, because they are very difficult to process in addition to being poor in stability against heat, atmosphere and UV light, only a few examples have been proved commercially successful.

Polyethylenedioxythiophene (PEDT), a conductive polymer, was disclosed as an antistaticity-imparting material, such as an antistatic coating, in U.S. Pat. Nos. 5,035,926 and 5,391,472, and its development is now being watched with keen interest because it is evaluated as solving the problems found in the above conductive polymers. With far superiority to polyanilines, polypyrroles and other polythiophene-based compounds in solubility, thermal and atmospheric stability, and resistance to UV light, PEDT can be used as a base material for coatings applicable to externally exposed parts to which the preexisting conductive polymers cannot be applied owing to their poor durability. Doped with a polymeric acid salt (e.g., polystyrene sulfonate), PEDT can be dispersed in water, and the dispersion is of good compatibility with lower alcohols, such as C1–C4 alcohol solvents, which are low in boiling point and ecologically favorable. The dilution in alcohols allows PEDT to be coated in various forms. Particularly, thin films made of such aqueous dispersions find numerous applications in cathode ray tube (CRT) glasses, plastic film surfaces, etc. Such water-dispersible PEDT polymers are now commercially available, representatively exemplified by Baytron P (Grade A4071) from Bayer.

To perfectly perform its characteristic functions, a coating for CRT external surfaces is required to be high in refractive index as well as conductivity. As being eligible for such a coating, inorganic thin films, such as ATO (antimontinoxide) and ITO (indiumtinoxide), have been used. A coating structure on a CRT glass panel is shown in FIG. 1. As shown in FIG. 1, the coating structure on a CRT glass panel 1 is typically composed of two layers: a high refractive, conductive layer 2 and a low refractive layer 3. Overlaying the conductive layer 2, the low refractive layer 3 is usually formed of $SiO_2$. A display which employs an ATO thin film or an ITO thin film as the conductive layer 2 can reduce the reflected light intensity of incident light on the CRT glass surface through an interference operation. Because the ATO or ITO thin film has a refractive index of 1.6 or higher, the reflected light from the surface of the ATO or ITO thin film shows a phase difference from that from the surface of the low refractive layer. This reflection-attenuating function is indispensable to almost all CRTs for computer monitors, near to which are the eyes of the users.

Details about the materials and structures of the reflection-attenuating coatings can be referred to U.S. Pat. Nos. 5,681,885, 5,572,086, 5,652,477 and 5,523,469.

As for a conventional PEDT conductive coating solution, it has a refractive index of only 1.30–1.40 when being formed into a film, which is even lower than 1.54, the minimal RI value required for CRT glass panels. Thus, superior as they are to the inorganic coatings in conductivity and transparency, conventional PEDT coatings have not been applied to CRT external glasses because of being insufficient in refractive index.

SUMMARY OF THE INVENTION

The intensive and thorough research on PEDT conductive thin films, repeated by the present inventors aiming to develop them for application to CRT glass panels, resulted in the finding that a highly refractive, inorganic sol, a dispersion medium comprising an amide solvent, and a sulfonic acid group ($SO_3H$)-containing monomer dopant, in combination, could improve the refractivity, conductivity and transparency of a polythiophene-based polymer composition.

Therefore, it is an object of the present invention to provide a polymer composition, which can be formed into a coating with high refractivity, conductivity and transparency.

Based on the present invention, the object could be accomplished by a provision of a composition comprises 2–20 weight % of an aqueous polythiophene-based conductive polymer solution having a solid content of 1.2–1.5 weight %; 0.5–20 weight % of a highly refractive, inorganic sol solution having a solid content of 14–16 weight %; 50–97.4 weight % of an alcohol containing 1–3 carbon atoms; 0.1–10 weight % of an amide solvent; 0.005–0.1 weight % of a water- or an alcohol-soluble resin binder; and 0.005–0.05 weight % of a sulfonic acid group-containing monomer dopant. A thin film formed by spin- or spray-coating the composition on a transparent substrate and baking the coating, has a refractive index of 1.6–2.0, a transmittance of 90–98% and a surface resistance of $1 \times 10^3 – 1 \times 10^8$ $\Omega/\square$.

The present invention may be understood more readily by reference to the following detailed description of preferred embodiments of the invention and the figures.

BRIEF DESCRIPTION OF THE DRAWINGS

FIG. 1 is a schematic cross sectional view illustrating a principle of attenuating reflected light intensity of incident light on a coating applied to a CRT external glass.

FIG. 2 is a schematic cross sectional view showing a low-reflective coating structure on a CRT glass, in accordance with the present invention.

DETAILED DESCRIPTION OF THE INVENTION

The conductive polymer useful in the present invention is PEDT, such as that commercially available from Bayer, identified as "Baytron P". Because of being doped with polystyrene sulfonate (PSS), the PEDT polymer is well dissolved in water in addition to exhibiting excellent stability against heat, moisture and UV light. Further, the aqueous polythiophene-based conductive polymer solution was found to maintain optimal water dispersibility when comprising PEDT and PSS at a total solid content of 1.0–1.5 weight % (thus, hereinafter, PEDT is referred to as PSS-doped PEDT unless the context clearly dictates otherwise). High solubility in water, alcohol, and solvents of large dielectric constants makes it easy to prepare a coating solution of high coatability. Furthermore, the coatings have a great advantage over those of other conductive polymers, such as polyaniline and polypyrrole, in terms of transparency.

In the polythiophene-based composition, the conductive PEDT polymer is preferably used at an amount of 2–20 weight %. For example, if too little PEDT polymer is used, a surface resistance of $10^8$ $\Omega/\square$, which is the minimum in a commercially valuable aspect of conductive thin films, cannot be achieved. On the other hand, an amount greater than 20 weight % leads to good conductivity, but causes a serious problem in that PEDT is gelled along with the highly refractive inorganic sol to be described later. Thus, it is unsuitable for the CRT external glass coating which must be highly uniform in thickness. In addition, too much PEDT causes the resulting coatings to be lower in transmittance than 90% because light is shielded by the characteristic color that the PEDT itself retains.

The present invention is characterized in that a metal oxide sol is used with the aim of increasing the refractive index of the PEDT thin film of the present invention. In this regard, preferable is the metal oxide sol which shows a refractive index of 1.6 or higher when being formed into a thin film. Examples of such metal oxide sols include $TiO_2$ sol (e.g., a hydrolyzed solution of TYZER TE from DuPont in methanol, a solid content of 15 wt %), $CeO_2$ sol (e.g., Colloidalceriasol from Nyacol, a solid content of 20 wt %), $TiO_2$—$Fe_2O_3$—$SiO_2$ sol (e.g., Optolake 1130F-2(A-8) from Catalyst & Chemicals Co., Ltd., a solid content of 30 wt %, dispersed in ethanol), $TiO_2$—$CeO_2$—$SiO_2$ sol (e.g., Optolake 1130A(A-8) from Catalyst & Chemicals Co., Ltd., a solid content of 30 wt %, dispersed in methanol), $TiO_2$—$ZrO_2$—$SiO_2$ sol (e.g., Optolake 1130Z from Catalyst & Chemicals Co., Ltd., a solid content of 15 wt %, dispersed in water), $TiO_2$—$CeO_2$ sol (e.g., a product from Catalyst & Chemicals Co., Ltd., a solid content of 20 wt %, dispersed in methanol), and $CeO_2$—$SiO_2$ sol (e.g., tetraethoxysilane (TEOS) hydrolyzed in aqueous $CeO_2$ solution and methanol, $CeO_2/SiO_2$=85/15 w/w, a solid content of 15 wt %).

Even if having a solid content of as much as 30 weight %, the highly refractive, inorganic sols may be used in entirety. However, it is preferred that the highly refractive, inorganic sols are diluted to a solution ranging, in solid content, from 14 to 16 weight %. For instance, if the solid content is too low, a desired refractive index cannot be obtained. On the other hand, when the solid content exceeds 16 weight %, great care must be taken when the highly refractive, inorganic sol solution is added in the conductive polymer-containing coating solution lest gelation should occur. In the polymer composition of the present invention, the inorganic sol is preferably added at an amount of 0.5–20 weight %. For example, if too little inorganic sol is added, a desired refractive index of as high as 1.6 cannot be achieved in the resulting polymer thin film. On the other hand, the amount of the inorganic sol is over 20 weight %, the thin film is superior in refractivity, but poor in conductivity, for example, shows a surface resistance of $10^8$ $\Omega/\square$ or higher. Further, the excessive amount causes gelation in the solution, making it difficult to obtain a highly uniform thin film.

In the present invention, a mix of alcohol and amide is used as a dispersion medium for the aqueous PEDT conductive solution and the highly refractive, inorganic sol solution. When an alcohol solvent is used alone, the coating is deteriorated in conductivity. In contrast, a combination of an alcohol and an amide brings about a substantial improvement in the conductivity of the coating, saving the aqueous PEDT conductive polymer solution. In other words, a sufficient conductivity can be obtained even at a reduced amount of PEDT conductive polymer. Accordingly, an economical advantage can be brought about. In addition, the use of an alcohol and an amide in combination lowers the occurrence frequency of the gelation, giving a great contribution to a long-term stabilization of the composition.

Useful are alcohols containing 1–3 carbon atoms, exemplified by methanol, ethanol, and isopropanol. Preference is in the order of methanol, ethanol and isopropanol. These alcohol solvents may be used alone or in combination. If two alcohol solvents are used in combination, methanol preferably composes 50% or more of the mixed alcohol when dispersibility is taken into account.

As for the amide solvent useful in the present invention, it has an intramolecular amide group [—N(R)—C=O] (R=alkyl). Examples of the amide solvents include formamide (FA), N-methylformamide (NMFA), N,N-dimethylformamide (DMF), acetamide (AA), N-methylacetamide (NMAA), N,N-dimethylacetic amide (DMA), N-methylpropionamide (NMPA) and N-methylpyrrolidone (NMP).

The dispersion medium comprises 50–97.4 weight % of the alcohol solvent and 0.1–10 weight % of the amide solvent. When the amide solvent is used at an amount of less than 0.1 weight %, desired conductivity cannot be attained. On the other hand, if the amide solvent is used at an amount of more than 10 weight %, conductivity can be brought into a desirable range, but the amide solvent remains at a trace amount owing to its high boiling temperature even after sintering at 150° C., so that the long-term stability of the composition may be deleteriously affected. Further, after coating, the residual amide solvent retards a subsequent process such as a secondary coating process.

With a composition comprising the aqueous PEDT conductive polymer solution, the highly refractive, inorganic sol solution, the alcohol solvent and the amide solvent, there may be obtained a desirable effect. However, if the PEDT is present at an amount of less than 10 weight %, the coating shows poor dispersibility and adhesiveness on a coating surface which is not sufficiently clean. In this case, water- or alcohol-soluble resin binders are used to prevent the deterioration of dispersibility and adhesiveness.

Examples of useful resin binders include polymethylmethacrylate (PMMA), polyacrylate (PAA), polyvinylalcohol (PVOH), polyvinylacetal (PVAT), polyvinylbutyral (PVB), methyl cellulose (MC), hydroxypropyl cellulose (HPC), hydroxyethyl cellulose (HEC), and polyvinylacetate (PVAc). These resin binders are preferably added in solution form (e.g., alcohol or water solution). It is preferable that the resin binder solution is added at a solid amount of 0.005–0.1 weight %. When the amount of the resin binder is less than 0.005 weight %, a desirable effect is not brought about in substrate adhesiveness so that the dispersibility of the coating is poor. On the other hand, when the amount exceeds 0.1 weight %, the high viscosity of the resin binder causes the coating to have a pattern of comb teeth after spin coating.

In accordance with the present invention, the PEDT conductive polymer is further doped with monomer dopants containing sulfonic acid groups in order to better the conductivity of the coating. Examples of the monomer dopants include p-toluene sulfonic acid (p-TSA), dodecylbenzene sulfonic acid (DDBSA), 1,5-anthraquinone disulfonic acid (1,5-AQSA), 2,6-anthraquinone disulfonic acid (2,6-AQSA), anthraquinone disulfonic acid (AQSA), 4-hydroxybenzene sulfonic acid (4-HBSA), methylsulfonic acid (MSA) and nitrobenzene sulfonic acid (NBSA). In the case that the monomer dopants exist as salts, such as sodium salts, they can be converted to acid forms using a nitric acid solution (pH 2). For use, the dopants in an acid form are made into an aqueous solution which has a concentration of 1–4 weight % and preferably 1–2 weight %.

In an aspect of dispersibility, a better result can be brought about when the monomer dopants are added as an aqueous solution form than when they are added as a solid form or crude liquid form. The dopants are preferably used at a solid amount of 0.005–0.05 weight % based on the weight of the composition. For instance, when the dopants are added at an amount of less than 0.005 weight %, there are obtained no positive effects on the conductivity. On the other hand, when the dopants are used at an amount exceeding 0.05 weight %, their poor dispersibility results in poor conductivity.

The polythiophene-based, conductive polymer composition of high conductivity, refractivity and transparency may be prepared by adding a PEDT conductive polymer with a highly refractive, inorganic sol solution, an alcohol solvent, an amide solvent, a sulfonic acid monomer dopant, and a water- or alcohol-soluble resin binder solution, in due order, with vigorous stirring and by mixing them homogeneously for 2–4 hours. Although having only a minute influence on the physical properties of the composition, the addition order is the above-enumerated order of the ingredients.

With reference to FIG. 2, there is shown a coating structure on a CRT glass panel, in accordance with the present invention. In order to form a thin film of low reflectivity, high conductivity, and high transparency, first, a CRT external glass 6 is polished with $CeO_2$, washed with ethanol, and dried. On this CRT external glass, the polymer composition is spin-coated at a thickness of about 100 nm to give a highly refractive, conductive layer 5 (RI=1.6–2.0). Thereafter, a tetraethoxysilane (TEOS)-hydrolyzed $SiO_2$ sol solution is spin-coated on the highly refractive, conductive layer to form a low refractive layer 4 (RI=1.45) about 95 nm thick. Finally, the coatings are dried at 150–200° C. for 0.5–1 hour to produce a hard film.

A better understanding of the present invention may be obtained in light of the following examples which are set forth to illustrate, but are not to be construed to limit the present invention. In the following examples, polymer compositions for coatings with high refractivity, conductivity and transparency were prepared from the components as follows:

Aqueous PEDT Conductive Solution
Baytron P 4071(solid content 1.3 weight %) from Bayer
Highly refractive solution:
$TiO_2$—$Fe_2O_3$—$SiO_2$ sol (Optolake 1130F-2(A-8), EtOH dispersed);
$TiO_2$—$CeO_2$—$SiO_2$ sol (Optolake 1130A(A-8), MeOH dispersed);
$TiO_2$—$ZrO_2$—$SiO_2$ sol (Optolake 1130Z, water dispersed);
$TiO_2$—$CeO_2$ sol (MeOH dispersed) (all were products from Catalyst & Chemicals Co., Ltd., Japan);
$CeO_2$—$SiO_2$ sol (SCG sol, TEOS hydrolyzed in aqueous $CeO_2$ solution and methanol, $CeO_2/SiO_2$=85/15 w/w).
Alcohol Solvent and Amide Solvent Products purchased from Aldrich were used without modification.

EXAMPLES I TO XII

Coating compositions were prepared as indicated from Table 1, below. In this regard, while being vigorously stirred in a 1 liter glass jar, aqueous PEDT conductive polymer solutions were added with highly refractive sol solutions dispersed in methanol, alcohol solvents, and amide solvents, in sequence, and the resulting solutions were sufficiently stirred for 3 hours at room temperature to give coating compositions. They were coated to a thickness of about 100 nm on glass surfaces and measured for physical properties. The results are given in Table 1, below.

TABLE 1

| | | Physical Properties of Coating | | | |
|---|---|---|---|---|---|
| Ex. Nos. | Compositions (wt %) | Surf. Resist. (KΩ/□) | Transmitt. (T %) | Refra. Index | Uniformity |
| 1 | PEDT(aq)/$TiO_2$—$CeO_2$—$SiO_2$ sol(MeOH)/MeOH/NMAA (18/3.6/77.9/0.5) | 4 | 96 | 1.62 | Good |
| 2 | PEDT(aq)/$TiO_2$—$CeO_2$—$SiO_2$ sol(MeOH)/MeOH/NMAA (15/3/81/1) | 6 | 97 | 1.70 | Good |
| 3 | PEDT(aq)/$TiO_2$—$CeO_2$—$SiO_2$ sol(MeOH)/MeOH/NMAA (10/2/86/2) | 12 | 98 | 1.72 | Good |
| 4 | PEDT(aq)/$TiO_2$—$CeO_2$—$SiO_2$ sol(MeOH)/MeOH/NMAA (6/1.2/88.8/4) | 50 | 98 | 1.70 | Good |
| 5 | PEDT(aq)/$TiO_2$—$Fe_2O_3$—$SiO_2$ sol(MeOH)/MeOH/NMAA (10/2/86/2) | 15 | 98 | 1.75 | Good |
| 6 | PEDT(aq)/$TiO_2$—$ZrO_2$—$SiO_2$ sol(MeOH)/MeOH/NMAA (10/1.5/84.5/4) | 12 | 98 | 1.70 | Good |
| 7 | PEDT(aq)/$TiO_2$—$CeO_2$ sol(MeOH)/MeOH/NMAA (10/1/88.5/0.5) | 14 | 98 | 1.77 | Good |
| 8 | PEDT(aq)/$CeO_2$—$SiO_2$ sol(MeOH)/MeOH/NMAA (8/1.5/89.5/1) | 18 | 98 | 1.75 | Good |
| 9 | PEDT(aq)/$TiO_2$—$ZrO_2SiO_2$ sol(MeOH)/MeOH/NMAA (10/1/83/6) | 20 | 98 | 1.65 | Good |
| 10 | PEDT(aq)/$TiO_2$—$ZrO_2SiO_2$ sol(MeOH)/MeOH/NMAA (10/1/87/2) | 8 | 98 | 1.64 | Good |
| 11 | PEDT(aq)/$TiO_2$—$ZrO_2$—$SiO_2$ sol(MeOH)/MeOH/NMAA (8/1.5/82.5/8) | 30 | 98 | 1.68 | Good |
| 12 | PEDT(aq)/$TiO_2$—$ZrO_2$—$SiO_2$ sol(MeOH)/MeOH/EtOH/NMAA (10/1.5/69.2/17.3/2.0) | 15 | 98 | 1.70 | Good |

EXAMPLES XIII TO XX

The same procedure as in Example I was repeated using the compositions according to the indications of Table 2, below. In these examples, resin binders and monomer dopants were additionally used added to the basic compositions of Examples I to XII. As the resin binders, PAA (water soluble), HPC (methanol soluble), PVB (ethanol soluble), and PVAc (ethanol soluble) were used. For the monomer dopants, p-TSA (water soluble), and 4-HBSA (water soluble) were selected. They were all purchased from Aldrich, U.S.A. For easy addition, the resin binders and the monomer dopants were diluted to 1% aqueous solutions or alcohol solutions.

The coatings were formed from the compositions and measured for physical properties. The results are given in Table 2, below.

and other transparent substrates to allow thin films which have a refractive index of 1.6–2.0, a transmittance of 90–98% and a surface resistance of $1\times10^3$–$1\times10^8$ $\Omega/\square$.

TABLE 2

| Ex. Nos. | Compositions (wt %) | Physical Properties of Coating | | | |
|---|---|---|---|---|---|
| | | Surf. Resist. (K$\Omega/\square$) | Transmitt. (T %) | Refra. Index | Uniformity |
| 13 | PEDP(aq)/TiO$_2$—CeO$_2$—SiO$_2$ sol(MeOH)/MeOH/NMAA/PAA (8/1/88.5/2/0.5) | 14 | 98 | 1.72 | Good |
| 14 | PEDP(aq)/TiO$_2$—CeO$_2$—SiO$_2$ sol(MeOH)/MeOH/NMAA/HPC (8/1/87/2/2) | 12 | 98 | 1.71 | Good |
| 15 | PEDP(aq)/TiO$_2$—CeO$_2$—SiO$_2$ sol(MeOH)/MeOH/NMAA/PVB (6/0.8/89.7/3/0.5) | 30 | 98 | 1.70 | Good |
| 16 | PEDP(aq)/TiO$_2$—CeO$_2$—SiO$_2$ sol(MeOH)/MeOH/NMAA/PVAc (6/0.8/84.2/5/4) | 40 | 98 | 1.70 | Good |
| 17 | PEDP(aq)/TiO$_2$—ZrO$_2$—SiO$_2$ sol(MeOH)/MeOH/NMAA/HPC/p-TSA (8/1/87/2/1/1) | 12 | 98 | 1.72 | Good |
| 18 | PEDP(aq)/TiO$_2$—ZrO$_2$—SiO$_2$ sol(MeOH)/MeOH/NMAA/HPC/p-TSA (8/1/86/2/1/2) | 8 | 98 | 1.72 | Good |
| 19 | PEDP(aq)/TiO$_2$—ZrO$_2$—SiO$_2$ sol(MeOH)/MeOH/NMAA/HPC/p-TSA (8/1/84/2/1/4) | 6 | 98 | 1.71 | Good |
| 20 | PEDP(aq)/TiO$_2$—ZrO$_2$—SiO$_2$ sol(MeOH)/MeOH/NMAA/HPC/4-HBSA (8/1/86/2/1/2) | 9 | 98 | 1.71 | Good |

Comparative Examples I to VI

In these Comparative Examples, the ratios of the gradients of the composition were deviated from the range of the present invention. The same procedure as in Example I was repeated using the compositions according to the indications of Table 3, below. The coatings were measured for physical properties and the results are given in Table 3, below.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

TABLE 3

| Ex. Nos. | PEDT/Alcohol/Amide/Dopant (wt %) | Physical Properties of Coating | | | |
|---|---|---|---|---|---|
| | | Surf. Resist. (K$\Omega/\square$) | Transmitt. (T %) | Refra. Index | Uniformity |
| C.1 | PEDP(aq)/TiO$_2$—CeO$_2$—SiO$_2$ sol(MeOH)/MeOH/NMAA (10/0/88/2) | 6 | 98 | 1.30 | Good |
| C.2 | PEDP(aq)/TiO$_2$—CeO$_2$—SiO$_2$ sol(MeOH)/MeOH/NMAA (10/0.4/87.6/2) | 8 | 98 | 1.55 | Good |
| C.3 | PEDP(aq)/TiO$_2$—CeO$_2$—SiO$_2$ sol(MeOH)/MeOH/NMAA (20/25/53/2) | 20 | 94 | 1.65 | Poor |
| C.4 | PEDP(aq)/TiO$_2$—CeO$_2$—SiO$_2$ sol(MeOH)/MeOH/NMAA (30/10/54/6) | 4 | 88 | 1.62 | Poor |
| C.5 | PEDP(aq)/TiO$_2$—CeO$_2$—SiO$_2$ sol(MeOH)/MeOH/NMAA (1/1/94/4) | $8 \times 10^6$ | 99 | 1.70 | Good |
| C.6 | PEDP(aq)/TiO$_2$—CeO$_2$—SiO$_2$ sol(MeOH)/MeOH/NMAA (6/2/91.95/0.05) | $5 \times 10^6$ | 98 | 1.72 | Good |

Assay for Physical Properties

Conductivity: measured for surface resistance per area using a multimeter.

Transmittance: measured at 550 nm using a UV-visible spectrometer.

Coating Refractivity: measured using the Ellipsometer of SamJung Optical Industries.

Coating Uniformity: evaluated as poor when coatings were non-uniform or gelled materials were present in coatings under observation with the naked eye.

As described hereinbefore, the coating compositions of the present invention can be applied to CRT external glass

What is claimed is:

1. A polymer composition comprising:
   2–20 weight % of an aqueous polyethylenedioxythiophene solution having a solid content of 1.2–1.5 weight %;
   0.5–20 weight % of a highly refractive, inorganic sol solution having a solid content of 14–16 weight %;
   50–97.4 weight % of an alcohol containing 1–3 carbon atoms;
   0.1–10 weight % of an amide solvent;
   0.005–0.1 weight % of a water- or an alcohol-soluble resin binder; and 0.005–0.05 weight % of a sulfonic acid group-containing monomer dopant.

2. A polymer composition as set forth in claim 1, wherein the highly refractive, inorganic sol solution is a metal oxide sol solution and has a refractive index of 1.6 or higher when being formed into a film.

3. A polymer composition as set forth in claim 1, wherein the amide solvent is selected from the group consisting of formamide, N-methylformamide, N,N-dimethylformamide, acetamide, N-methylacetamide, N,N-dimethylacetamide, N-methylpropionamide, N-methylpyrrolidone, and mixtures thereof.

4. A polymer composition as set forth in claim 1, wherein the resin binder is selected from the group consisting of polymethylmethacrylate, polyacrylate, polyvinylalcohol, polyvinylacetal, polyvinylbutyral, methylcellulose, hydroxypropylcellulose, hydroxyethylcellulose, polyvinylacetate, and mixtures thereof.

5. A polymer composition as set forth in claim 1, wherein the sulfonic acid group-containing monomer dopant is selected from the group consisting of p-toluene sulfonic acid, dodecylbenzene sulfonic acid, 1,5-anthraquinonedisulfonic acid, 2,6-anthraquinonedisulfonic acid, anthraquinonesulfonic acid, 4-hydroxybenzene sulfonic acid, methylsulfonic acid, nitrobenzene sulfonic acid and mixtures thereof.

6. A refractive, conductive, transparent thin film prepared using the polymer composition for coating of claim 1.

7. A polymer composition as set forth in claim 2, wherein the metal oxide sol is selected from the group consisting of $TiO_2$ sol, $CeO_2$ sol, $TiO_2$—$Fe_2O_3$—$SiO_2$ sol, $TiO_2$—$CeO_2$—$SiO_2$ sol, $TiO_2$—$ZrO_2$—$SiO_2$ sol, $TiO_2$—$CeO_2$ sol, $CeO_2$—$SiO_2$, and mixtures thereof.

* * * * *